G. VAN DAAM.
PREHEATING DEVICE.
APPLICATION FILED MAR. 27, 1914.
1,155,112.
Patented Sept. 28, 1915.
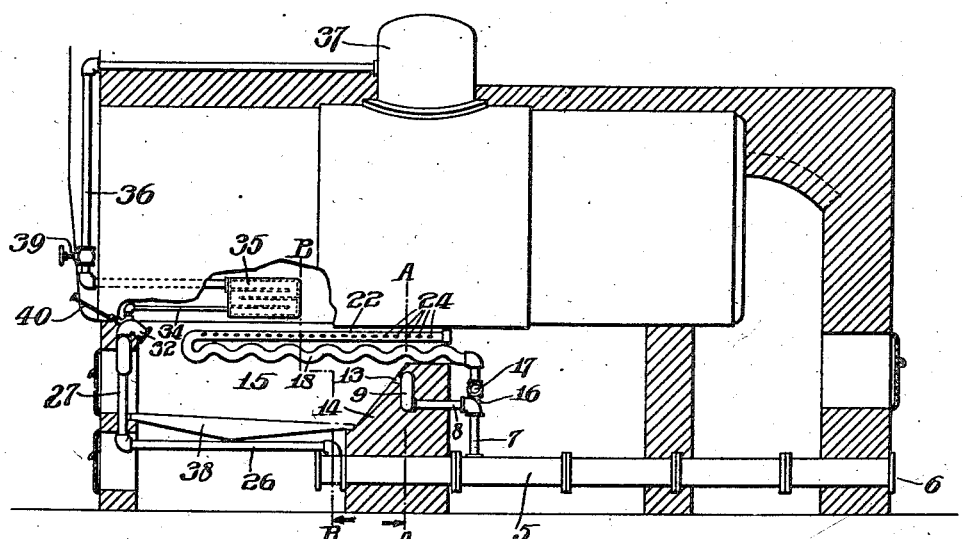
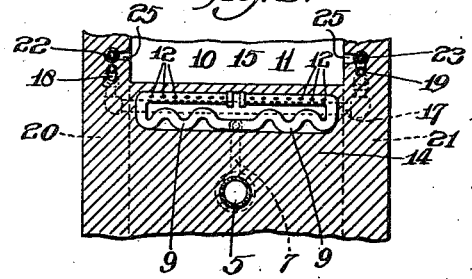
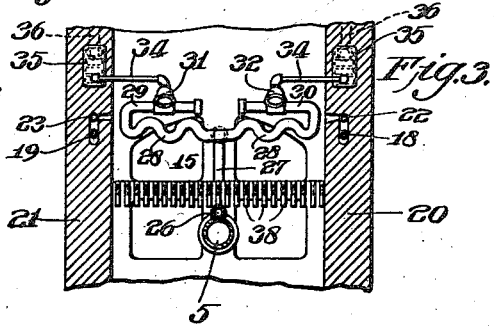
WITNESSES:
INVENTOR
Gerrit Van Daam
BY
ATTORNEY.

UNITED STATES PATENT OFFICE.

GERRIT VAN DAAM, OF BUFFALO, NEW YORK.

PREHEATING DEVICE.

1,155,112.   Specification of Letters Patent.   Patented Sept. 28, 1915.

Application filed March 27, 1914. Serial No. 827,657.

*To all whom it may concern:*

Be it known that I, GERRIT VAN DAAM, a citizen of the United States, residing at Buffalo, in the county of Erie, State of New York, having invented a new and useful Preheating Device, of which the following is a specification.

My invention relates to improvements in means for facilitating combustion in boiler furnaces and the like.

The object is to provide improved means for delivering preheated air and pre-heated air and steam combined into the combustion chamber.

Referring to the drawings, which illustrate merely by way of example, a suitable embodiment of my invention, Figure 1 is a longitudinal vertical section of a boiler furnace showing my improved means. Fig. 2 is a cross-section on line A—A of Fig. 1. Fig. 3 is a cross-section on line B—B of Fig. 1. Fig. 4 is a sectional detail.

Similar numerals refer to similar parts throughout the several views.

5 is a conductor having an intake for air outside of the furnace walls, as at 6. From conductor 5 air is delivered through pipe 7, pipe 8 and the undulated pipe 9 branching therefrom, and delivering to the converging extensions 10 and 11 provided with the discharge vents 12. These discharge vents deliver to a channel 13 in the bridge wall 14 of the combustion chamber 15. The pipe 9 is undulated in order to add to its heating extension. As this pipe 9 and the extensions 10 and 11 are embedded in the structure of the bridge wall, the air passing therethrough becomes very effectively heated, and the ordinary draft of the furnace secures an efficient flow of air from conductor 5 to the extensions 10 and 11 and through the discharge vents 12, at a point where it may be efficiently mixed with the gases arising in the fuel bed to facilitate in the combustion thereof. From the same conductor 5 also leads a pipe 16 which delivers to a branch 17 which delivers to the pipes 18 and 19 located in the side walls 20 and 21 of the furnaces. Pipes 18 and 19 are undulated so as to add to the heating extension thereof. Pipes 18 and 19 deliver to pipes 22 and 23 respectively, which are doubled back and extend in a horizontal plane above the said pipes 18 and 19. These pipes 22 and 23 are provided with the discharge vents 24 which deliver into the channels 25 of the walls 20 and 21 which open into the combustion chamber 15. Leading also from conductor 5 is the pipe 26 which projects beneath the grate toward the front of the furnace, where it delivers to the upright pipe 27 which in turn delivers to the undulated pipe 28 which leads by return bends to the two horizontal extensions 29 and 30, which deliver to the injector nozzles 31 and 32. These injector nozzles are provided with the needle valve controlled vents 33, which are connected by the pipes 34 through the superheating devices 35 and the pipe 36, with the source of steam supply 37, so that superheated steam may be injected through the needle controlled vent 33 into the nozzle 31 to mingle and drive therethrough the heated air delivered from 29 and 30. A hand-operated valve 39 is provided on the steam pipe 36 as an additional control to the hand-operated needle valve 40. It will thus be seen that the air delivered to 31 and 32 has become thoroughly heated by passing through pipe 26 close beneath the grate bars 38 and then through the undulate piping 28 in the front wall of the combustion chamber. It will thus be seen that means are provided for the abundant supply of pre-heated air to the combustion chamber of the furnace to secure the complete combustion of the gases arising from the fuel bed before the same escape to the stack. That is to say, the pre-heated air is discharged over the fuel bed through the discharge vents 24 on either side of the longitudinal extension of the combustion chamber. Pre-heated air is also discharged through the discharge vents 12 located in the bridge wall at a critical point where the gases would normally escape over said bridge wall, and where desirable hot air and super-heated dry steam may be injected through the injector nozzles 30 and 31 from the forward end of the fuel chamber. In this way is prevented any possibility of unconsumed gases escaping from the combustion chamber and consequently the highest efficiency in heat units from the fuel is secured.

What I claim is:—

1. The combination with a furnace, of an air conducting main having an air intake, opening to the atmosphere at a point outside the furnace wall and below the level of the fuel bed, and a conductor leading from said main to the front part of the furnace and delivering to an upwardly extending pipe which in turn delivers to an undulating pipe extension which in turn delivers to a return horizontal extension delivering to an injector, said injector comprising a bell-shaped discharge nozzle and a needle valve controled steam jet delivering thereto.

2. The combination with the combustion chamber, of means for delivering hot air and superheated steam mixed together, above the fuel bed, comprising an inclined, flaring-mouth, bell-shaped delivery nozzle, a conductor leading thereto from a preheated air supply and a coöperating needle-valve-controlled nozzle located within the first mentioned nozzle and forming an integral part thereof, said needle-valve-controlled nozzle being connected with a preheated steam supply and delivering at substantially the same inclination as said first mentioned nozzle.

GERRIT VAN DAAM.

Witnesses:
 MAE HOFMANN,
 RALPH H. GAMBLE.